United States Patent [19]

Braca et al.

[11] Patent Number: 5,328,882
[45] Date of Patent: Jul. 12, 1994

[54] NICKEL CATALYST ACTIVE IN ETHYLENE HOMO AND COPOLYMERIZATION

[75] Inventors: Giuseppe Braca, Pisa; Anna M. Raspolli Galletti, Titignano Navacchio; Stefano Pinori, Pontedera; Glauco Sbrana, Pisa, all of Italy

[73] Assignee: Enichem S.P.A., Milan, Italy

[21] Appl. No.: 22,162

[22] Filed: Feb. 25, 1993

[30] Foreign Application Priority Data

Feb. 26, 1992 [IT] Italy .................. MI92 A 000415

[51] Int. Cl.$^5$ .................. B01J 31/06; B01J 31/22
[52] U.S. Cl. .................. 502/155; 502/159; 502/162; 502/167; 526/352
[58] Field of Search .............. 502/155, 159, 162, 167

[56] References Cited

U.S. PATENT DOCUMENTS 5,026,675  1/1991  Braca et al. .................. 502/159

FOREIGN PATENT DOCUMENTS 0137389   4/1985  European Pat. Off. .
0393751  10/1990  European Pat. Off. .
90/15085 12/1990  PCT Int'l Appl. .

OTHER PUBLICATIONS

M. Peuckert and W. Keim, Organometallics 2, 594-597 (1983).

Primary Examiner—Joseph L. Schofer
Assistant Examiner—David Wu
Attorney, Agent, or Firm—Oblon, Spivak, McClelland, Maier & Neustadt

[57] ABSTRACT

A catalyst active in the preparation of ethylene homo and copolymers consists of a nickel complex bound to a polystyrene support and definable by the general formula (I):

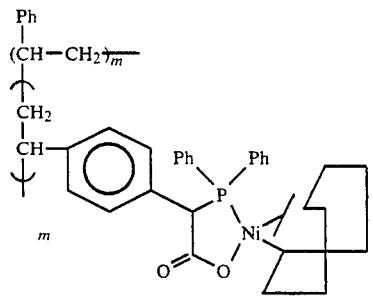

in which Ph, m and n have the meaning given in the description. The catalyst preparation and its use in ethylene polymerization and ethylene copolymerization with other unsaturated monomers are described.

8 Claims, No Drawings

NICKEL CATALYST ACTIVE IN ETHYLENE HOMO AND COPOLYMERIZATION

This invention relates to a nickel complex catalyst bound to a polystyrene support, its preparation and its use in ethylene homopolymerization and in ethylene copolymerization with other unsaturated monomers for producing high molecular weight polymers. Ethylene and α-olefins in general are traditionally polymerized by Ziegler-Natta catalysts generally formed from a hydride or organometal compound of the elements of groups I to III of the periodic table, and a compound of a transition metal pertaining to groups IV to VI of the periodic table.

The patent literature also describes non-traditional catalysts based on certain nickel complexes able to polymerize olefins, such as those reported in the patent applications IT 20186/A89, IT 22075/A90, DE 3,228,865, EP 137,389 and WO 90/15085. The literature [M. Penkert, W. Keim; Organometallics 2, 594 (1983)] also describes both the synthesis and the catalytic activity of a nickel complex containing a phosphine carboxylic chelating ligand active in ethylene oligomerization; this complex is cyclooctenylnickel-PPh$_2$ acetate and corresponds to the following structural formula:

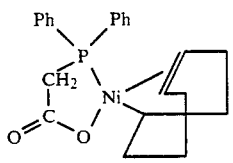

This complex, known hereinafter by the acronym (CiOtNiPPH$_2$AC), has been prepared by reacting nickel bis-cyclooctadiene [Ni(cod)$_2$] with triphenylphosphinoacetic acid.

(CiOtNiPPH$_2$AC) has been supported on silica or silica-alumina by impregnation, and the catalyst system obtained has been used in the preparation of ethylene oligomers [M. Peuchert, W. Keim; J. Molecular Catalysis 22, 289, (1984)]. The acid nature of the support in this catalyst system favours isomerization reactions of the double bond, with consequent reduction in the quantity of terminal olefins in oligomers of ethylene with the higher α-olefins [G. Nesterov et al., Makromol. Chem., Rapid. Comm., 10, 669, (1989)].

The object of the present invention is therefore to provide a heterogeneous catalyst system based on (CiOtNiPPH$_2$AC) bound to an inert polystyrene (PS) support, which is active in the preparation of ethylene homopolymers and its copolymers with higher α-olefins or other unsaturated monomers, and has a catalytic activity similar to that of the same catalyst when unsupported, but leads selectively to the formation of polymers or copolymers instead of oligomers.

In accordance therewith, the present invention firstly provides a nickel complex catalyst bound to a polystyrene support, which is active in the copolymerization of ethylene with another unsaturated monomer and is defined by the formula (I):

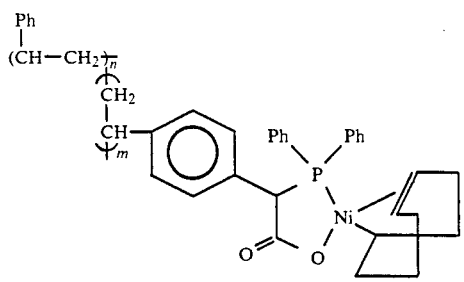

in which Ph is a phenyl, and m and n are numbers dependent on the molecular weight of the polystyrene and the extent of its functionalization, the ratio n/m being between 1/1 and 100/1. In the preferred embodiment the ratio n/m is between 15/1 and 40/1.

The catalyst (I) can be prepared by a process generrally comprising the following stages. In the first reaction stage the polystyrene (PS) is reacted with a chloromethylating agent consisting of a chloromethylalkylether of general formula (ClCH$_2$OR), where R is a C$_1$-C$_{12}$ and preferably a C$_6$-C$_8$ alkyl radical, to form polystyrene chloromethylated in the para position of some of its phenyls:

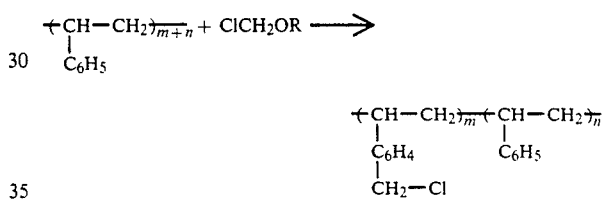

The normal solid polystyrenes of M$_w$ between 50,000 and 900,000, possibly crosslinked with up to about 60 wt % of divinylbenzene (DVB) can be used for the reaction. In the preferred embodiment a polystyrene crosslinked with 2-10 wt % of divinylbenzene is used, chloromethylated with chloromethyl-hexylether (ClCH$_2$OC$_6$H$_{13}$). In practice, a solution or suspension of polystyrene in a chlorinated organic solvent is firstly prepared. If a suspension is prepared, the polystyrene is preferably in the form of spherical granules with a size of the order of 0.1-1 mm. The chlorinated organic solvents which can be used for the purpose include the mono-, di- and polychlorinated liquid aliphatic hydrocarbons; in the preferred embodiment chloroform, dichloroethane or trichloroethane is used.

The chloromethylation reaction is performed by bringing the polystyrene and the chosen chloromethylating compound into contact within the chosen chlorinated organic solvent in the presence of a Lewis acid, preferably SnCl$_4$, as catalyst, operating at a temperature of between 0° and 100° C. and preferably between 40° and 80° C., for a time of between 2 and 10 hours.

The ratio of the chloromethylating agent (ClCH$_2$OR) to the organic polymer varies according to the desired amount of chloromethylated phenyl groups on the polymer. Generally between 0.5 and 5 moles of chloromethylating agent are used per polystyrene monomer unit. Operating under the aforestated conditions, a chloromethylation yield of between 20 and 70%, evaluated on the resin phenyl rings, is generally obtained.

The chloromethylated polystyrene is conveniently separated by filtration from the reaction mixture, washed with an acidic aqueous solution, with water and then with a solvent. In the second reaction stage the chloromethylated polystyrene is reacted with potassium diphenylphosphide (KPPh$_2$) as phosphinating agent, to obtain a methylenephosphinated polystyrene in accordance with the equation:

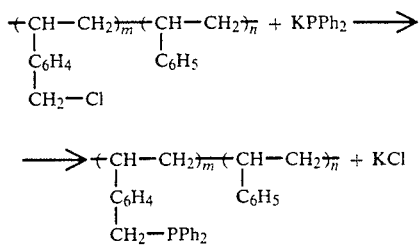

In practice the potassium diphenylphosphide in anhydrous tetrahydrofuran (THF), prepared by the method described in the literature [K. G. Allum et al; J. Organomet. Chem. 87 (1975), 189] starting from potassium sand and diphenylphosphine, is reacted in large excess (phosphide/Cl eq. on resin=3/1) with the chloromethylated resin under reflux. The polystyrene functionalized in this manner is washed in succession with a methanol-water mixture, a methanol-acetic acid mixture and then with pure methanol. The phosphinated resin yield is practically quantitative.

In the third reaction stage the methylenephosphinated polystyrene is reacted with a metallating agent (M) to obtain the polystyrene phosphinate metallated on the methylene group in accordance with the equation:

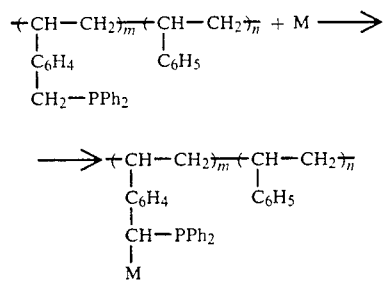

Metallating agents suitable for the purpose are alkyls (C$_1$-C$_{12}$), hydrides or amides of the alkaline metals and particularly of sodium, lithium or potassium. Specific examples of these metallating agents are Li-n-butyl, Li-sec-butyl, Na-amyl, K-cumyl, Li-diisopropylamide and NaH.

These metallating agents can be used in combination with typical metallation activators such as N,N,N',N'-tetramethylethylenediamine (TMEDA), potassium t-butylate and diazodicyclooctane.

In practice, a solution or suspension of the methylenephosphinated polystyrene in an inert organic solvent is prepared. Organic solvents which can be used for this purpose include aliphatic, cycloaliphatic or aromatic liquid hydrocarbons such as cyclohexane and benzene, benzene being preferred.

The metallation reaction is achieved by bringing the chosen metallatable polymer and metallating agent into contact in the organic solvent, possibly adding an activator for said metallating agent, operating at a temperature of between 0° and 150° C., and preferably between 40° and 80° C., for a time generally of between 1 and 48 hours. The ratio of metallating agent to methylenephosphinated polystyrene is generally between 3 and 7 moles of metallating agent per mole of total methylenephosphinic groups. The best results are obtained by using Li-alkyls and preferably Li-n-butyl as metallating agent, in combination with one of the aforesaid activators, preferably TMEDA.

In the fourth reaction stage the solution or suspension originating from the third stage is treated with solid carbon dioxide to give the metal salt of polystyrene-diphenylphosphinoacetic acid in accordance with the following reaction:

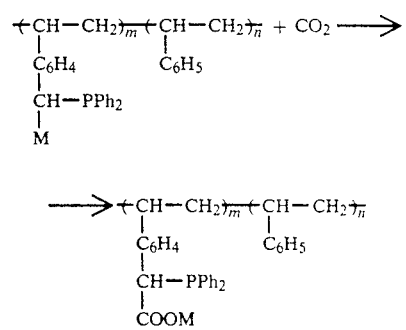

The reaction is conducted by directly adding ground dry ice repeatedly (three times) in large excess to the suspension or solution of the polymer in the hydrocarbon solvent. The solid product containing the adduct of the TMEDA-lithium salt of the polystyrene-diphenylphosphinoacetic acid is separated by filtration and treated with an aqueous 4% NaOH solution before being subjected to the next reaction stage.

In the fifth reaction stage the suspension is acidified with an inorganic acid, preferably hydrochloric acid. In this manner the metal is released from the salt, to obtain polystyrene-diphenylphosphinoacetic acid in accordance with the following reaction:

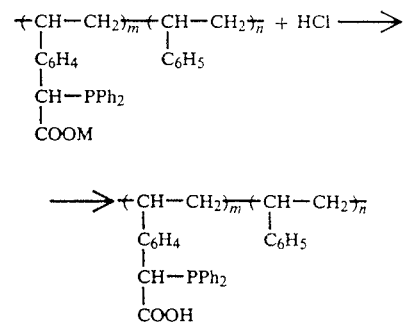

The reaction is conducted at ambient temperature for a short time, generally less than one hour.

In the sixth and last reaction stage the polystyrene-diphenylphosphinoacetic acid is brought into contact and reacted with nickel bis-cyclooctadiene, [Ni(cod)$_2$], to produce the catalyst (I) of the invention in accordance with the equation:

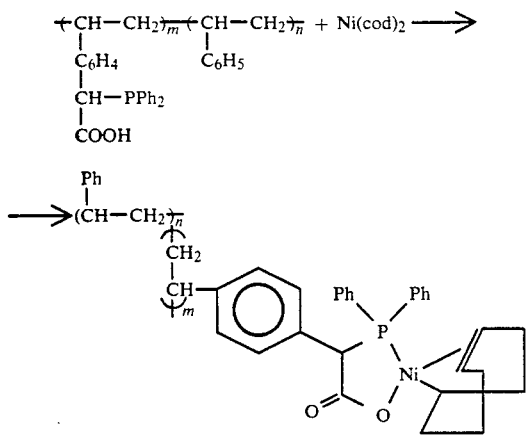

More specifically, in the sixth reaction stage the polystyrene-diphenylphosphinoacetic acid is suspended in an inert hydrocarbon solvent, such as an aromatic solvent and preferably benzene or toluene, a zerovalent nickel complex such as [Ni(cod)$_2$] then being gradually added to the suspension obtained in this manner, operating at ambient temperature.

When the [Ni(cod)$_2$] addition is complete the reaction mixture is left under agitation at ambient temperature for 12 hours. In this manner the catalyst of the present invention is obtained in the form of beads in the relative mother liquor. The beads are of red-brown colour, their nickel content varying from 0.2 to 5% by weight and being totally dependent on the respective values of m and n in the structural formula (I).

The catalyst can be separated from the mother liquor by evaporating the solvent at low temperature, for example between 40° and 50° C., under vacuum.

The catalyst is sensitive to oxygen and moisture, and all operations for its preparation have to be conducted in an inert atmosphere, such as an argon atmosphere.

The catalyst of the present invention is active in ethylene homopolymerization and in ethylene copolymerization with another unsaturated monomer. The expression "another unsaturated monomer" as used in the present description means another α-olefin or an unsaturated acrylic or vinyl monomer.

Examples of such unsaturated monomers which can be copolymerized with ethylene include propylene, $C_1$-$C_{12}$ alkyl esters of acrylic or methacrylic acid such as methyl and ethyl acrylate and methacrylate, vinyl acetate, acrylonitrile and styrene. Ethylene polymerization or copolymerization can be conducted by the normal polymerization methods, including the solvent-absent gas-solid phase method. However the preferred method is that of suspension in a liquid organic diluent, normally chosen from aliphatic, cycloaliphatic and aromatic hydrocarbons, such as hexane or toluene, or the actual reagent olefins in the liquid state. A stabilizing ligand in the form of a phosphine, phosphine oxide or phosphite or a heterocyclic nitrogenated base is added in a molar ratio to the metal of between 0.5 and 10 and preferably between 1 and 1.5 to the catalyst in suspension in its own mother preparation liquid or in the organic solvent, and the mixture fed into the reactor in which the polymerization takes place. Examples of phosphines or phosphites usable for the purpose include triarylphosphines, arylalkylphosphines, triaryl- or arylalkyl-phosphites and the corresponding phosphine oxides. Examples of heterocyclic nitrogenated bases include pyridine and piperidine. Ethylene or a mixture of ethylene and another unsaturated monomer is conveniently fed to said liquid reaction medium, operating at a temperature of between 10° and 100° C. and at a pressure of $10^5$ Pa or higher. In the preferred embodiment the polymerization temperature is chosen between 20° and 60° C. and the pressure between atmospheric and $100.10^5$ Pa.

Operating under these conditions, ethylene polymers and copolymers are obtained in the solid state with a molecular weight depending on the polymerization conditions, and suitable for practical use. Surprisingly these polymers and copolymers are obtained in the form of beads of 1-7 mm diameter. This result is of great practical interest as it makes it unnecessary to melt and granulate the polymer, as is normally done in the known art to give the polymer a physical form suitable for its subsequent processing and transformation.

The following experimental examples are given to better illustrate the invention.

In Examples 1 and 2 the polymerization catalyst, corresponding to the aforesaid general formula (I), is synthesized in accordance with the aforegoing description.

EXAMPLE 1

Synthesis of nickel [1,4,5η]-4-cycloocten-1-yl-[diphenylphosphinoacetate-O,P] catalyst anchored to a macroporous resin in the form of ST/DVB beads The polymer matrix used was a macroporous ST/DVB resin (8% divinylbenzene, with a specific surface of 65 m$^2$/g dry and with 50% of the pore diameters exceeding 300 Å).

a) Resin chloromethylation

Chloromethylation of the ST/DVB resin is conducted by the procedure described in the literature [A. Warshawsky, A. Deshe, J. Polymer Sci., Pol. Chem. Ed. 23 (1985) 1839] using chloromethylether as the chloromethylating agent. This latter is prepared from n-hexanol and paraformaldehyde in the presence of gaseous HCl by the method described in the literature (preceding reference).

The ST/DVB resin (11.45 g), previously dried under vacuum for 12 hours at 50° C., is reacted with 60 g (0.4 moles) of chloromethylhexylether in dichloroethane (70 cm$^3$).

After 2 hours of agitation at ambient temperature 2 cm$^3$ (17.4 mmoles) of SnCl$_4$ are added and the suspension kept under agitation for 6 hours at 40°-45° C., during which the appearance of a reddish coloration is observed, this progressively becoming darker. Agitation is continued overnight at ambient temperature. After filtering and washing with 5% hydrochloric acid, water, 95% methanol and finally absolute ethanol, 13.33 g of chloromethylated resin are obtained, with a chlorine content of 10.8%.

b) Resin phosphination

The resin is phosphinated by reacting the chloromethylated resin with potassium diphenylphosphide prepared as described in the literature [K. G. Allum, R. D. Hancock, I. V. Howell, R. C. Pitkelty, P. J. Robinson, J. Organomet. Chem. 87 (1975), 189], by reacting potassium (potassium sand in THF) with chlorodiphenylphosphine. The chloromethylated resin (9.67 g, 29 meq) is added in small portions to a solution of potassium diphenylphosphide (100 mmoles) in tetrahydrofuran (THF) over a period of 2 hours with the solvent under reflux, after which the suspension is kept under agitation overnight at ambient temperature.

After filtering and washing under a head of nitrogen with methanol/water (1/1), methanol/acetic acid (10 vol % of acetic acid) and pure methanol, 14.9 g of phosphinated resin are obtained with a phosphorus content of 7.1% and with residual chlorine present only in traces.

c) Lithiation and carbonation of the phosphinated resin

The phosphinated resin (2.48 g, 5.7 meq of P) is suspended in 100 cm$^3$ of anhydrous benzene and agitated very slowly (to avoid possible disintegration) at ambient temperature for 30 minutes, after which 4.0 g (5.2 cm$^3$, 34 mmoles) of TMEDA are added, followed by 22 cm$^3$ (35 mmoles) of a 1.6M solution of n-butyllithium in hexane, added dropwise over a period of one hour at ambient temperature. The red suspension is kept under agitation overnight at ambient temperature, after which ground dry ice is added rapidly in an argon atmosphere, in such a quantity as to fill the reaction vessel. This carbonation is repeated a further three times, after which the resin is filtered off under a head of nitrogen, dried, transferred rapidly under a head of argon into a deaerated aqueous 4% sodium hydroxide solution (80 cm$^3$) and maintained under very slow agitation at ambient temperature for 30 minutes. After acidifying the suspension with deaerated 10% hydrochloric acid, the resin is maintained under very slow agitation for a further 30 minutes at ambient temperature, filtered and dried. 2.72 g of functionalized resin are obtained with a phosphorus content of 5.9%.

d) Synthesis of nickel catalyst anchored to the functionalized resin 203.9 mg of the functionalized ST/DVB resin (0.4 meq of chelating ligand) are reacted in an argon atmosphere at ambient temperature with 150.0 mg (0.55 mmoles) of bis(cyclooctadiene)nickel(O) [Ni(COD)$_2$] in 20 cm$^3$ of anhydrous toluene. At the moment of adding the nickel complex the instantaneous formation of a dark red coloration is observed.

The suspension is kept under agitation at ambient temperature for three hours and used as such together with its mother liquors for the ethylene polymerization reaction (see Example 3).

EXAMPLE 2

Synthesis of nickel [1,4,5η]-4-cycloocten-1-yl-[diphenylphosphinoacetate-O,P] catalyst anchored to a commercial chloromethylated ST/DVB resin in powder form (200–400 mesh)

The nickel [1,4,5η]-4-cycloocten-1-yl-[diphenylphosphinoacetate-O,P] catalyst anchored to a commercial chloromethylated ST/DVB resin in the form of powder of 200–400 mesh particle size with a chlorine content of 15.2% is prepared by the method described in Example 1, effecting the phosphination reaction directly on the chloromethylated resin.

8.04 g of phosphinated resin with a phosphorus content of 3.0% and 10.0% residual chlorine are obtained from 8.1 g of chloromethylated resin reacted with 0.1 moles of potassium diphenylphosphide.

3.91 g of the phosphinated resin are then lithiated with 34.4 mmoles of n-butyllithium (1.6M solution in hexane) and 34 mmoles of TMEDA, and then carbonated with solid CO$_2$, to obtain 3.51 g of resin functionalized with diphenylphosphinoacetic groups, with a phosphorus content of 2.1% and 7.8% residual chlorine. To prepare the catalyst 350 mg of functionalized resin (0.24 meq of chelating ligand) suspended in 20 cm$^3$ of toluene and 158 mg (0.58 mmoles) of Ni(COD)$_2$.

EXAMPLE 3

Polymerization of ethylene with nickel [1,4,5η]-4-cycloocten-1-yl-[diphenylphosphino-acetate-O,P] catalyst anchored to a macroporous resin in the form of ST/DVB beads (catalyst obtained in Example 1)

The supported catalyst suspension in toluene of Example 1 (obtained from 204 mg of resin and 150 mg of Ni(COD)$_2$) plus 152 mg (0.58 mmoles) of triphenylphosphine is transferred under a head of argon to a pivoted stainless steel pressure vessel of 125 cm$^3$ capacity. The pressure vessel, charged with ethylene to a constant pressure of 5±1 MPa, is maintained under agitation at 75° C. for three hours, during which a pressure reduction of 4 MPa is observed.

On termination of the test the pressure vessel was completely full of polyethylene in the form of white beads of 3–5 mm diameter, with repetition of the morphology of the support. The solvent, completely absorbed in the polyethylene, is removed by evaporation at 50° C. under vacuum, to give 18.7 g of dry polymer (average turnover=0.247 kg of polyethylene per g of Ni chelate per hour). The solvent, condensed in a trap cooled to −70° C., shows the presence only of traces of liquid ethylene oligomers.

The formed polyethylene is characterised by a melting point of about 136° C. (measured by differential scanning calorimetry), a weight average molecular weight M$_w$ of 630,000 (six hundred and thirty thousand) (determined by gel permeation chromatography) and an intrinsic viscosity of about 5 dl/g.

EXAMPLE 4

Polymerization of ethylene with nickel [1,4,5η]-4-cycloocten-1-yl-[diphenylphosphino-acetate-O,P] catalyst anchored to a Merryfield ST/DVB commercial resin in powder form (catalyst obtained in Example 2)

The reaction follows the procedure described in Example 3. Starting from the supported catalyst suspension in toluene of Example 2, obtained from 350 mg of resin and 158 mg of Ni(COD)$_2$ plus 208 mg (0.79 mmoles) of triphenylphosphine, a pulverulent polymer product is obtained after three hours of reaction with ethylene at a pressure of 6.2±1 MPa in a pressure vessel at 75° C. The solvent, completely absorbed in the polyethylene, is removed by evaporation under vacuum, to give 7.2 g of dry polymer (average turnover=0.178 kg of polyethylene per g of nickel chelate per hour). The solvent, condensed in a trap cooled to −70° C., shows the presence only of traces of liquid ethylene oligomers when analyzed by gas chromatography as described in Example 3.

EXAMPLE 5

Copolymerization of ethylene with methylmethacrylate using nickel [1,4,5η]-4-cycloocten-1-yl-[diphenylphosphino-acetate-O,P] catalyst anchored to a Merryfield ST/DVB commercial resin in powder form (catalyst obtained in Example 2)

The procedure used for the copolymerization is analogous to that described in Example 4 for ethylene homopolymerization, a solution of methylmethacrylate in toluene being added either when polymerization commences or at the very beginning.

A supported catalyst suspension in toluene of Example 2, obtained from 770 mg of resin and 320 mg of Ni(COD)$_2$ plus 441 mg of triphenylphosphine, is re-acted with ethylene at a pressure of 6±1 MPa in a pressure vessel at 75° C. When an absorption of about 1 MPa is observed, a solution of methylmethacrylate in toluene (5.6 g, i.e. 56.1 mmoles, in 6 cm$^3$ of toluene) is fed into the pressure vessel.

The reaction is then allowed to proceed maintaining constant pressure, for a reaction time of 20 hours.

After removing the solvent and any unreacted methylmethacrylate, the polymer is extracted with boiling chloroform to remove any methylmethacrylate which may have remained within the polymer without having undergone copolymerization. After extraction and evaporation under vacuum, 12.33 grams of copolymer in powder form are obtained containing 0.5 mol % of methylmethacrylate comonomer. If instead 9.5 g of methylmethacrylate are added at the very beginning, and using the same quantities of supported catalyst and triphenylphosphine, after 20 hours 5.5 g of copolymer are obtained, which after extraction is found to have a methylmethacrylate content of about 1 mol %.

EXAMPLE 6 (comparison example)

Oligomerization of ethylene with soluble nickel [(1,4,5η)-4-cycloocten-1-yl][2-diphenylphosphino-2-phenylacetate-O,P] as catalyst In order to more clearly demonstrate the particular and selective behaviour of the catalyst when anchored to functionalized resins, a comparison test is effected using as catalyst the analogous solvent-soluble nickel complex with the low molecular weight chelating ligand.

For this purpose the soluble nickel [(1,4,5η)-4-cycloocten-1-yl][2-diphenylphosphino-2-phenylacetate-O,P] complex obtained from the chelating ligand 2-diphenylphosphino-2-phenylacetic acid is used, this latter being synthesized from benzyl bromide by reaction with diphenylphosphine (HPPh$_2$) followed by lithiation and carbonation as reported in the literature [S. Trippet, J. Chem. Soc. 2813 (1961); H. P. Abicht, K. Issleib, Z. Anorg. Allg. Chem. 422, (1976), 237], in accordance with the following scheme:

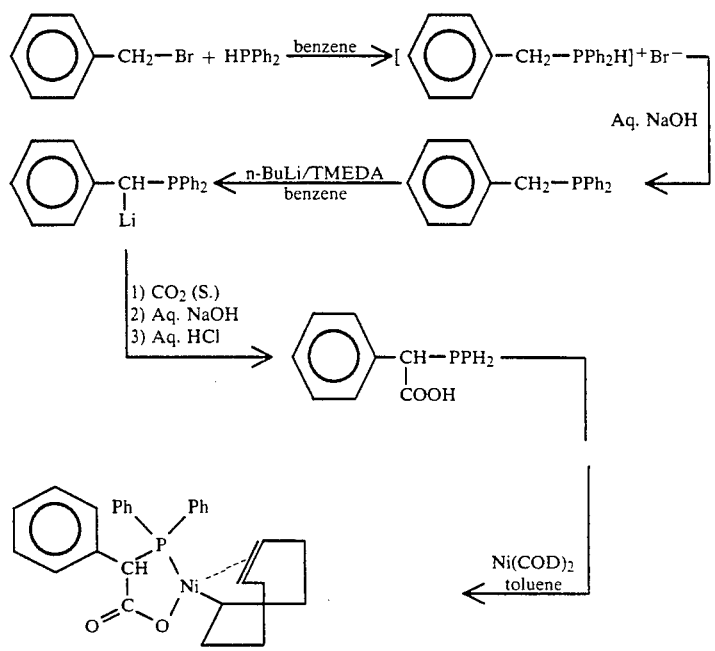

A solution of the soluble nickel [(1,4,5η)-4-cycloocten-1-yl][2-diphenylphosphino-2-phenylacetate-O,P] complex in 20 cm$^3$ of anhydrous toluene plus 93 mg (0.35 mmoles) of triphenylphosphine is transferred under a head of argon to a stainless steel pivoted pressure vessel of 125 cm$^3$ capacity. The pressure vessel, charged with ethylene to a pressure of 5 MPa, is maintained under agitation at 75° C. for three hours, during which a pressure reduction of 3.9 MPa is observed.

The liquid reaction mixture discharged from the pressure vessel contains 9.53 g of liquid ethylene oligomers dissolved in 17.3 g of toluene.

The average turnover is 0.216 kg of oligomer per g of Ni chelate per hour.

When analyzed by gas chromatography (SE-52 capillary column) the liquid ethylene oligomers (C$_4$–C$_{18}$ isomers) are found to have a Schulz-Flory distribution, with 1-hexene as the main product. No high molecular weight insoluble polyethylene formation is found.

We claim:

1. A nickel complex catalyst bound to a polystyrene support, which is active in ethylene homopolymerization or ethylene copolymerization with another unsaturated monomer, having n unsubstituted styrene monomer units and m substituted styrene monomer units, the substituted styrene monomer units defined by the formula:

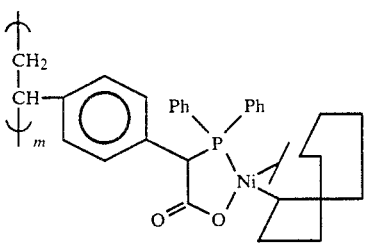

in which Ph is phenyl, and m and n are numbers dependent on the molecular weight of the polystyrene, the ratio n/m being between 1/1 and 100/1.

2. The catalyst as claimed in claim 1, wherein the ratio n/m is between 15/1 and 40/1.

3. A process for preparing the catalyst claimed in claims 1 or 2, comprising six reaction stages, wherein:

in the first reaction stage the polystyrene is reacted with a chloromethylating agent consisting of a chloromethylalkylether of the formula (ClCH$_2$OR), where R is a C$_1$-C$_{12}$ alkyl radical, to form polystyrene chloromethylated in the para position of some of its phenyls:

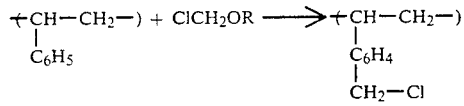

in the second reaction stage the chloromethylated polystyrene is reacted with potassium diphenylphosphide (KPPh$_2$) as phosphinating agent, to obtain a methylenephosphinated polystyrene in accordance with the equation:

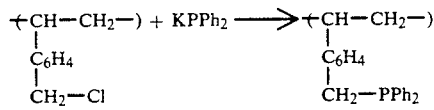

in the third reaction stage the methylenephosphinated polystyrene is reacted with a metallating agent (M) to obtain the polystyrene phosphinate metallated on the methylene group in accordance with the equation:

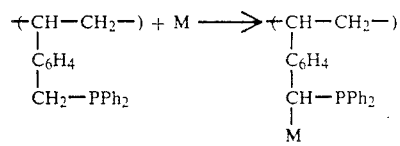

in the fourth reaction stage the solution or suspension originating from the third stage is treated with carbon dioxide to give the metal salt of polystyrene-diphenylphosphinoacetic acid in accordance with the following reaction:

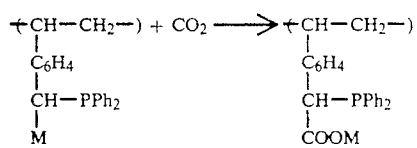

in the fifth reaction stage the polystyrene-diphenylphosphinoacetic acid metal salt produced in the preceding stage is suspended in a dilute NaOH solution and the suspension is acidified with an inorganic acid to release the metal from the salt and obtain polystyrene-diphenylphosphinoacetic acid in accordance with the following reaction:

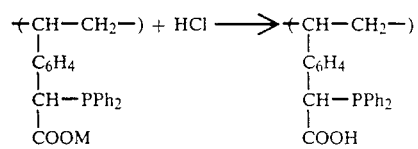

in the sixth reaction stage the polystyrene-diphenylphosphinoacetic acid is brought into contact and reacted with nickel biscyclooctadiene, to produce the catalyst of claim 1.

4. The catalyst preparation method as claimed in claim 3, wherein in the first reaction stage a solid polystyrene crosslinked with up to 60 wt % of divinylbenzene is used.

5. The catalyst preparation method as claimed in claim 3, wherein in the third stage the metallating agent used is Li-n-butyl in combination with N,N,N',N'-tetramethylethylenediamine as the metallation reaction activator.

6. The catalyst preparation method as claimed in claim 3, wherein in the first reaction stage a chloromethylating agent consisting of a chloromethylalkylether of the formula (ClCH$_2$OR), where R is a C$_6$-C$_8$ alkyl radical, is used.

7. The catalyst preparation method as claimed in claim 3, wherein in the fifth reaction stage the suspension is acidified with hydrochloric acid.

8. The catalyst preparation method as claimed in claim 4, wherein in the first reaction stage a solid polystyrene crosslinked with 2-10 wt % of divinylbenzene is used.

* * * * *